United States Patent [19]

Buechele et al.

[11] Patent Number: 4,693,288

[45] Date of Patent: Sep. 15, 1987

[54] UNIVERSAL JOINT MAKER

[75] Inventors: Juergen W. Buechele; Guenter Fisher, both of LaGrangeville, N.Y.

[73] Assignee: G & F Precision, Inc., LaGrangeville, N.Y.

[21] Appl. No.: 918,158

[22] Filed: Oct. 14, 1986

[51] Int. Cl.$^4$ ............................. B27F 5/00; B27F 1/04
[52] U.S. Cl. ......................................... 144/87; 144/85;
    144/134 R; 144/136 R; 144/253 R; 144/245 R;
    144/287; 409/182; 409/199
[58] Field of Search ............... 144/2 R, 85, 87, 134 R,
    144/136 R, 136 C, 137, 145 R, 286 R, 286 A,
    287, 253 R, 245 R; 51/170; 409/87, 89, 199, 182

[56] References Cited

U.S. PATENT DOCUMENTS

| 125,282 | 4/1872 | Gear et al. |
|---|---|---|
| 725,025 | 3/1915 | Patten |
| 2,445,039 | 7/1948 | Rusnok ............................ 144/136 C |
| 2,542,615 | 2/1951 | Balazs ............................... 144/136 |
| 3,160,995 | 12/1964 | Dunski .............................. 51/170 |
| 3,223,132 | 12/1965 | Erne ................................. 144/87 |
| 3,238,980 | 3/1966 | Goldstein ............................ 144/2 |
| 3,306,324 | 2/1967 | Lillywhite ........................... 144/3 |
| 3,339,601 | 9/1967 | Christman et al. ................. 144/2 |
| 3,454,061 | 7/1969 | Cordone et al. ................. 144/134 |
| 3,799,224 | 3/1974 | Vizzielo ........................... 144/133 |
| 4,024,898 | 5/1977 | Bergler et al. .................... 144/134 |
| 4,155,383 | 5/1979 | Welliver .......................... 144/134 |
| 4,163,465 | 8/1979 | Strong ............................. 144/87 |
| 4,209,045 | 6/1980 | Bassett ............................ 144/287 |
| 4,290,464 | 9/1981 | Marsan .......................... 144/136 C |
| 4,337,011 | 6/1982 | Schmid ........................... 409/199 |
| 4,428,408 | 1/1984 | Grisley ......................... 144/144.5 R |
| 4,509,572 | 4/1985 | L'Archer ........................... 144/85 |
| 4,593,735 | 6/1986 | Wirth, Jr. ........................ 144/137 |

Primary Examiner—W. D. Bray

[57] ABSTRACT

Interlocking joints such as box finger joints and dovetail joints are made in wood parts by a combination including a body for attachment to a tool table having a guide slot in the upper surface for guiding a work feeder. The combination includes a router tool and a vertically adjustable tool holder for holding and carrying the router tool with the router cutter axis parallel to the upper surface of the tool table attached to the body. The tool holder is formed substantially in the shape of a sector of a circle and is attached to the body by a pivotal attachment substantially at the center of the arc of the sector. The tool holder includes a circular arc shaped gear rack at the arcuate edge thereof, and a pinion gear is rotatably attached to the body and in engagement with the gear rack or vertical adjustment of the tool holder.

13 Claims, 27 Drawing Figures

UNIVERSAL JOINT MAKER

BACKGROUND OF THE INVENTION

The present invention relates to woodworking tools which are especially useful for the production of joints in wooden parts such as box finger joints and dovetail joints. Such joints are commonly used for such purposes as joining the sides of a box structure at the edges thereof.

The present invention is directed to a relatively simple and inexpensive tool combination for producing joints of the above description. It is believed that there is no truly satisfactory tool that is presently available for use in a small woodworking shop for the above purpose.

One tool of this general type which is presently available on the market generally conforms with the teachings of U.S. Pat. No. 4,163,465 issued Aug. 7, 1979 to Donald Strong. That patent relates to a structure including a tool table together with a support plate vertically movable by means of two screw jacks which are coupled together by a drive chain to selected positions above the tool table. The support plate is arranged to support a router tool for the purpose of making cuts in wood parts supported upon the tool table. That tool combination is effective, to some extent, to produce satisfactory box finger joints and dovetail joints, and other joints of that kind. However, the structure is cumbersome and complicated and expensive to produce. Furthermore, a special purpose table must be provided which has no other purpose or utility.

Accordingly, it is an object of the present invention to produce a woodworking tool combination which overcomes each and every one of the above-mentioned disadvantages of the structure of the Strong patent.

Furthermore, it is another object of the present invention to provide an improved universal joint maker which may be added onto another existing table tool such as a table saw, and which may be adjusted so as to be out of the way so as to avoid any interference with the operation of the existing tool.

Other objects and advantages of the invention will be apparent from the following description and the accompanying drawings.

SUMMARY OF THE INVENTION

In carrying out the invention there is provided a woodworking tool combination for making interlocking joints in wood parts such as box finger joints and dovetail joints comprising a substantially rectangular body means for attachment to a tool table which includes at least one guide slot in the upper surface thereof for guiding a work feeding means, a work feeding means positioned and arranged for sliding engagement with said guide slot, a router tool, a vertically adjustable tool holder for holding and carrying said router tool with the router cutter axis parallel to said upper surface of said tool table attached to said body means, said body means being attached to a side edge of said tool table parallel to said guide slot, said tool holder being formed substantially in the shape of a sector of a circle and being attached to said body means by a pivotal attachment substantially at the center of the arc of said sector, said tool holder including a circular arc shaped gear rack at the circular arcuate edge thereof, a pinion gear rotatably attached to said body means and in engagement with said gear rack and including rotating means for vertical adjustment of said tool holder by rotation of said tool holder about said pivotal attachment by rotation of said pinion gear, and means for clamping said circular arcuate edge of said tool holder in a selected vertical position.

DESCRIPTION OF PREFERRED EMBODIMENTS

Figure 1:
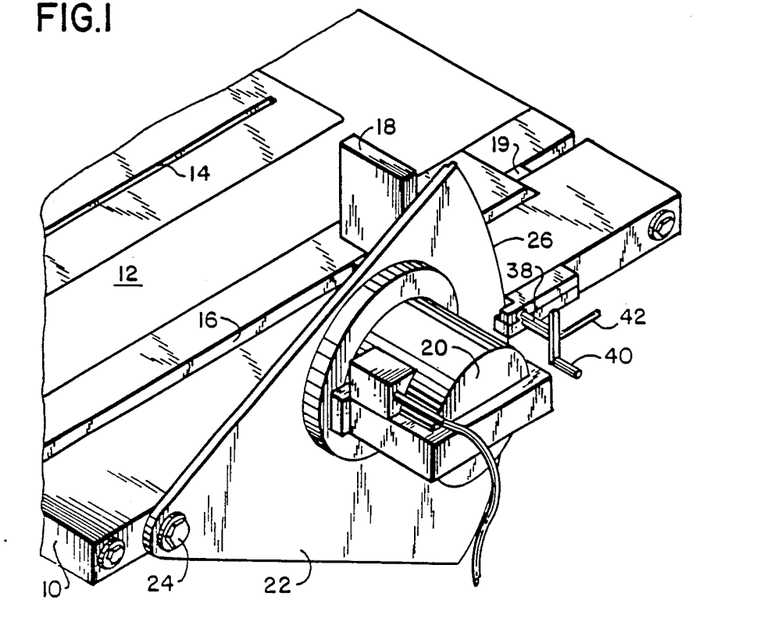
FIG. 1 is a perspective front view of a preferred embodiment of the invention.

Referring particularly to FIG. 1, there is shown a front perspective view of a preferred embodiment of the invention which is a woodworking tool combination for making interlocking joints in wood parts such as box finger joints and dovetail joints. It includes a body member 10 which is attached to a tool table 12. The tool table 12 may be a table which is primarily designed to incorporate another tool such as a table saw. This is indicated in the drawing by a slot 14 in the table 12 through which a working table saw blade may be raised. The legs of the tool table are not shown in the drawing in order to simplify the drawing.

The body member 10 includes a guide slot 16 for guiding a work feeding device 18. The work feeding device 18 includes a rail 19 in the bottom thereof which rides in the guide slot 16 to maintain a constant lateral position of a work piece as it is advanced through a cutting tool.

The combination also includes a routing tool 20 which is fastened to and carried by a vertically adjustable tool holder 22. The routing tool 20 may be a conventional electric motor driven router, and it may preferably be attached to the tool holder by a fastening means such as bolts. The tool holder 22 is arranged perpendicular to the upper surface of the tool table 12, and the upper surface of the body member 10. The upper surfaces of those two components preferably being coplanar. The axis of the router tool 20 is then substantially parallel to the upper surfaces of the tool table and of the body member 10. The body member 10 is attached to a side edge of the tool table 12. The guide slot 16 is parallel to the tool holder 22 and to the side edges of the body member 10.

The tool holder 22 is formed substantially in the shape of a sector of a circle, and is attached to the body member by a pivotal attachment bolt 24 which is substantially at the center of the arc of the sector. The tool holder 22 includes a circular arc shaped gear rack 26 at the circular arcuate edge thereof.

Figure 2:
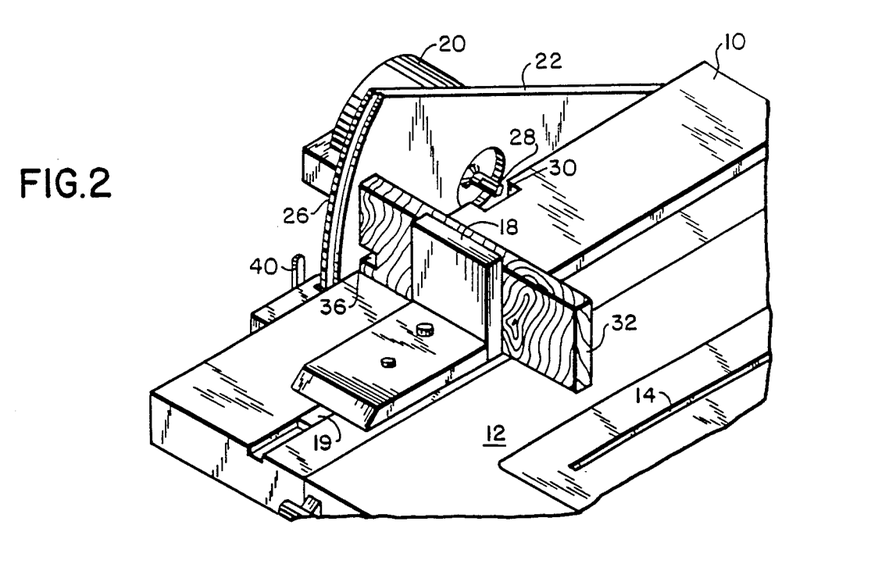
FIG. 2 is a perspective rear view of a preferred embodiment of the invention.

FIG. 2 is a rear perspective view of the woodworking tool combination of FIG. 1 with the tool holder adjusted to substantially the same vertical position. The gear rack 26 is more clearly shown in FIG. 2. Also in FIG. 2, the router tool cutter 28 is shown. As further shown at 30 in FIG. 2, the body member 10 includes a slot 30 in the edge thereof to provide clearance for the router tool cutter 28 as the router and the cutter 28 are lowered by the tool holder 22. The tool holder 22 may be lowered to a position such that the entire tool holder is at, or below, the plane of the upper surface of the body member and the table as shown and described more fully in connection with FIG. 4 below. Also in FIG. 2, a work piece 32 is shown in place against the work feeder device 18. The work piece 32, a piece of wood, is held by the operator against the advancing face of the feeding device 18, and held vertical in that manner, and with the left end 34 against the face of the tool holder 22. To further illustrate the operation the device, a slot is shown at 36 in the work piece 32 which has been cut by the cutter 28.

Referring back again to FIG. 1, a pinion gear is rotatably supported in suitable bearings within a part of the body member 10 and is positioned to engage with the gear rack 26. The pinion gear is not visible in FIG. 1, but it is connected to an operating shaft 38 which is rotatable by a hand crank 40 to thereby adjust the vertical position of the tool holder 22. A locking clamp device is also provided for the tool holder 22 by means of a clamping lever 41 which is tightened by a screw-threaded locking bolt actuated by a locking hand lever 42.

It will be understood that the guide slot 16 may be provided in the tool table 12, rather than in the body member 10, in which case the body member 10 may be very narrow in width. Thus, an existing guide slot 16 within the tool table 12 may be utilized for the purpose of the present invention.

Figure 3:
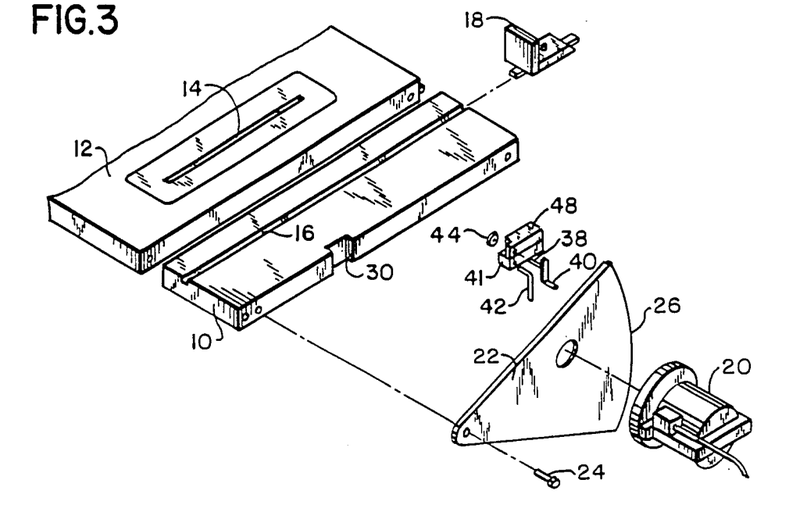
FIG. 3 is an exploded perspective front view of the embodiment of FIG. 1.

FIG. 3 is an exploded rear view of the embodiment of FIG. 1 which further exemplifies the structure. It additionally shows the pinion gear 44, the clamping lever 41, and a pinion gear bearing member 48.

Figure 4:
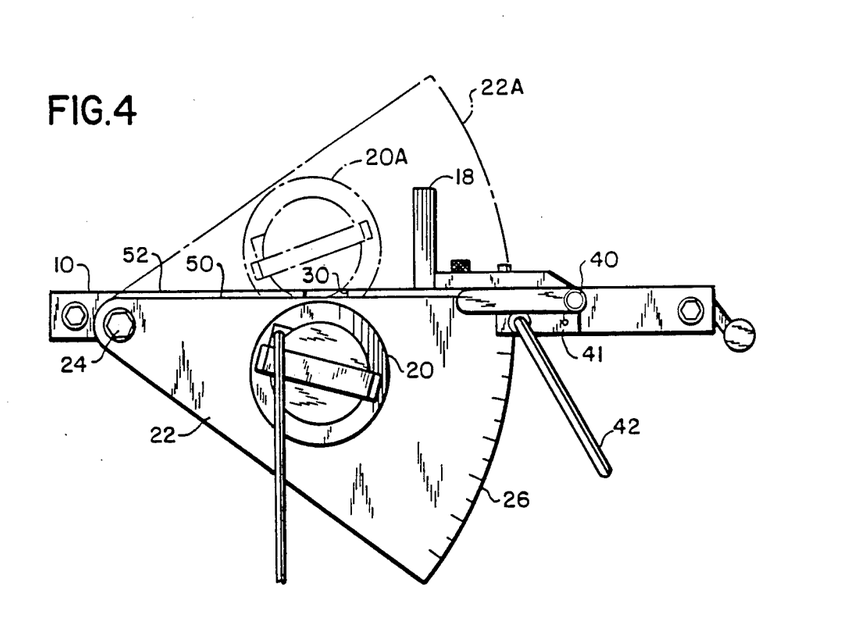
FIG. 4 is a front view of the embodiment of FIG. 1 showing the tool in the lowered position so as to permit utilization of the table for other purposes, and showing the tool holder in phantom in a raised position.

FIG. 4 is a front view of the apparatus of FIG. 1 showing the tool holder 22 in the lowered position such that the top edge 50 of the tool holder 22 is below the level of the upper surface 52 of the body member 10. In this position, it is to be seen that all of the parts of the woodworking tool combination including the tool holder 22, the router 20, and associated parts are positioned below the level of the surface 52 of the body member 10, and thus below the level of the tool table 12.

Accordingly, the tool table 12 is not obstructed in any way for use of the tool table for other purposes.

In FIG. 4, to further illustrate the different positions of the tool holder 22, the raised position of the tool holder 22 is shown in phantom at 22A with the router 20 in the raised position at 20A.

Figure 5:
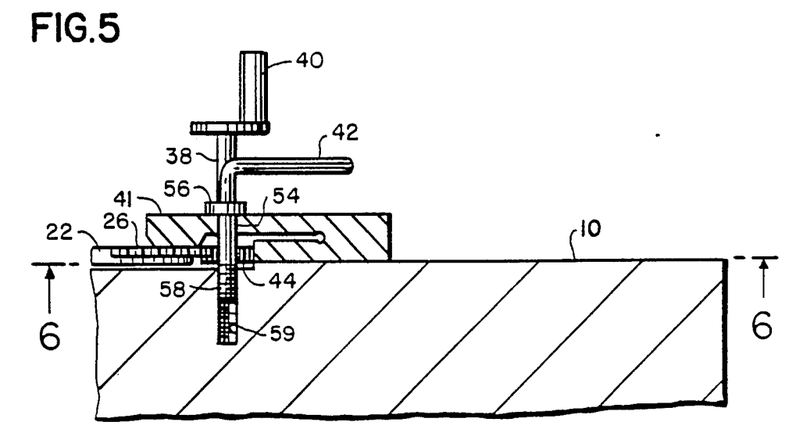
FIG. 5 is a bottom detail illustrating a clamping means and a pinion drive for a tool holder.

FIG. 5 is a bottom detail view of the portion of the structure shown in prior figures including the hand crank 40, the locking hand lever 42, and the clamping lever 41, and also showing the pinion gear 44, the gear rack 26, and an edge of the tool holder 22. The portion of the body member 10 which is shown in FIG. 5 is sectioned at a horizontal plane which passes through the center line of the shaft of the locking hand lever 42. The shaft of the locking hand lever 42 is illustrated at 54, and is shown to include a collar 56 which bears down upon the clamping lever 41. The shaft 54 also includes a threaded end portion 58 which is threaded into a suitably threaded hole 59 in the body portion 10 for biasing the clamping lever 41 against the outer surface of the tool holder 22 in order to clamp that tool holder in a desired position. The clamping lever 41 is securely held and fastened to the body member 10 at the right end thereof, but the clamping left end is a cantilever which is flexible enough to be easily moved into clamping engagement against the tool holder 22.

Figure 6:
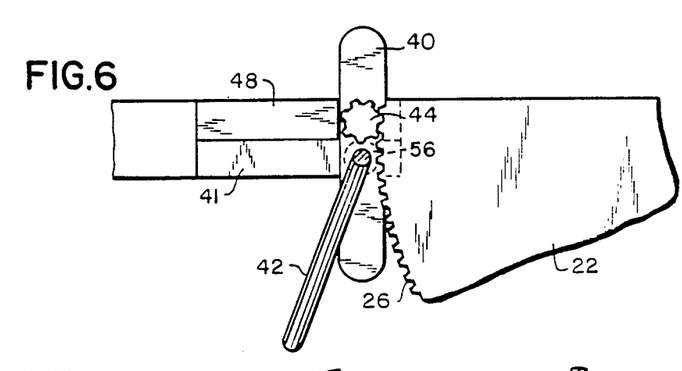
FIG. 6 is an enlarged detail, partly in section, illustrating further aspects of the clamping means and the pinion gear drive.

FIG. 6 is a partial detail rear view of the structure of FIG. 5 taken at section 6—6 in FIG. 5 to better illustrate the relationship of the pinion gear 44 to the rack gear 26.

Figure 7:
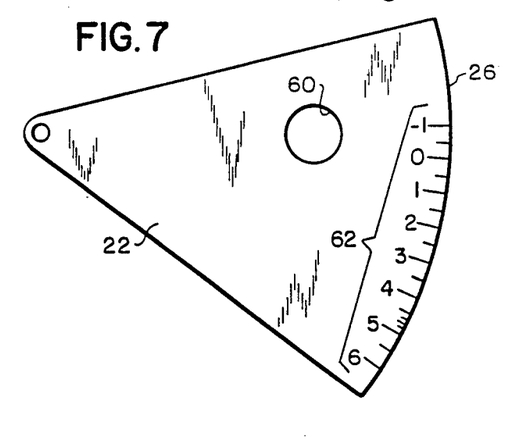
FIG. 7 is a front view of the tool holder disassembled from the remainder of the combination.

FIG. 7 is a detail view of the tool holder 22 alone, showing the opening 60 through which the router tool bit extends, and showing a scale of index measurement marks 62 which provide a direct reading of the distance of the center line of the router tool bit above the upper work surface of the body member 10 and the tool table 12. That surface was indicated as 52 in FIG. 4.

To accommodate for the fact that the tool holder 22 is rotating as it is moved upward, the scale 62, in order to provide an accurate direct reading of the upward displacement of the tool, must be a function of the trigonometric sine of the angle of rotation of the sector shaped tool holder 22. Because of size reduction in the drawing, the markings are not all shown. However, the engraved scale markings 62 are preferably divided for one sixteenth of an inch increment measurements in elevation of the tool.

Since the scale markings 62 are at a greater radius from the center of rotation of the sector than is the router tool, the gear rack 26 and the sector 22 must be moved more than one sixteenth of an inch in order to provide a one sixteenth inch adjustment in the position of the tool. This amplification of movement provides for greater accuracy in the adjustment of the tool holder 22 based upon the readings on the scale 62. The readings on the scale 62 are made in relation to an appropriate engraved index mark on the edge of the pinion bearing member 48. However, the lower edge of that bearing member may also be employed as an indexing level, if desired.

Figure 8:
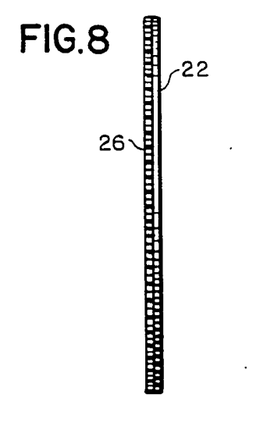
FIG. 8 is an end view of the tool holder of FIG. 7.

FIG. 8 is an end view of the tool holder 22 of FIG. 7 which is included to further illustrate the details of construction of the tool holder.

FIGS. 9, 10, and 11 and 12 illustrate various joints which can be easily fabricated by the use of the tool of the present invention.

Figures 9, 10, 11, 12:
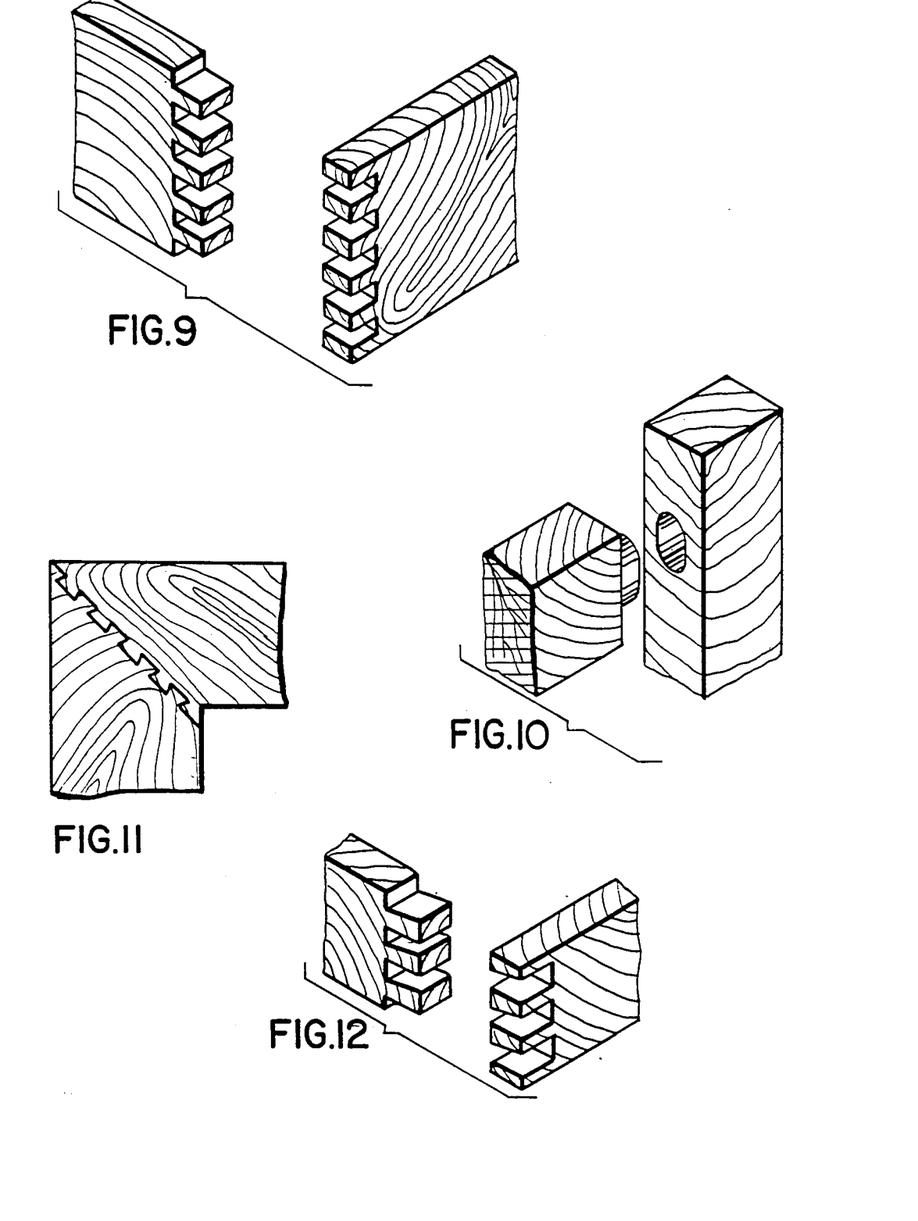
FIG. 9 illustrates the production of a box finger joint which is easily produced in accordance with the present invention.
FIG. 10 illustrates a mortise and tenon joint which is easily fabricated by the apparatus of the present invention.
FIG. 11 illustrates a multiple tongue and groove corner joint which is easily fabricated by the present invention.
FIG. 12 illustrates a corner dovetail joint which is easily fabricated by the present invention.

FIG. 9 illustrates a box finger joint after the edges of the work piece have been cut with the proper slots by means of the tool of the present invention, and before the work pieces have been fastened together at the joint.

FIG. 10 illustrates a mortise and tenon joint which is easily fabricated by the apparatus of the present invention.

FIG. 11 illustrates a multiple tongue and groove corner joint which is easily fabricated by the present invention.

FIG. 12 illustrates a corner dovetail joint which is also easily fabricated by the present invention.

FIG. 13-27 all relate to components and various assembly options for the work feeder device 18 previously shown and described in connection with FIGS. 1-4. The preferred feeder device components include a base plate 64 illustrated in FIG. 13.

Figure 13:
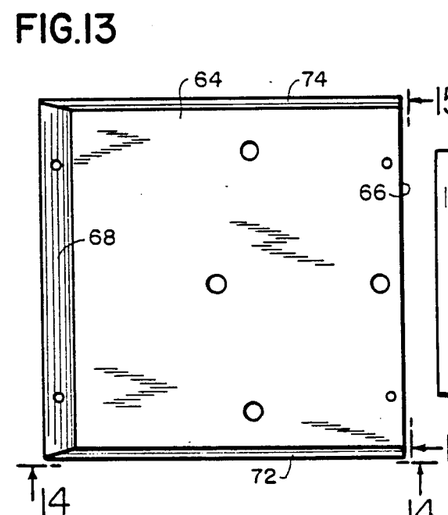
FIGS. 13–27 relate to components and various assembly options for a work feeder device which provide various positioning angles for a work piece in which joints are to be produced in accordance with the present invention.

As shown in FIG. 13, that base plate preferably has edge faces which are each at different selected angles. For instance, the right edge face 66 in FIG. 13 is preferably at a ninety degree "right" angle with respect to the top and bottom faces. The edge face 68 shown at the left in FIG. 13 is preferably at forty five degrees. The edge face 74 of the base plate 64 shown at the top of FIG. 13 is preferably at an angle of fourteen degrees from the vertical. Similarly, the edge face 72 shown at the bottom of FIG. 13 is at an angle of nine degrees to the vertical. These various edge face angles are clearly shown in FIGS. 14 and 15.

Figure 14:
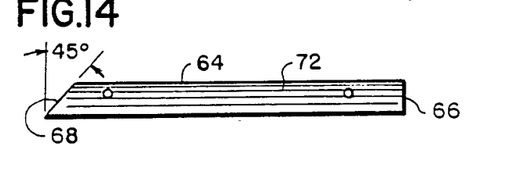

FIG. 14 is an edge view taken at line 14—14 of FIG. 13, and shows in profile the forty five degree edge face 68 and the ninety degree edge face 66.

Figure 15:
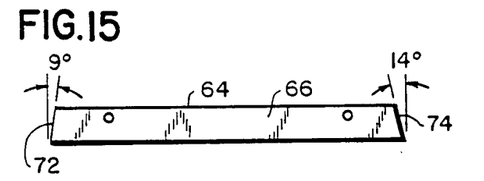

FIG. 15 is an edge view taken at line 15—15 in FIG. 13 and showing the nine degree edge face 72 and fourteen degree edge face 74 in profile. All of the edge face angles of the base plate 64 are of significance in producing desired cuts in work pieces for the various joints to be produced according to FIGS. 9-12, as well as other joints which can be produced by the tool combination of the present invention.

Figure 16:
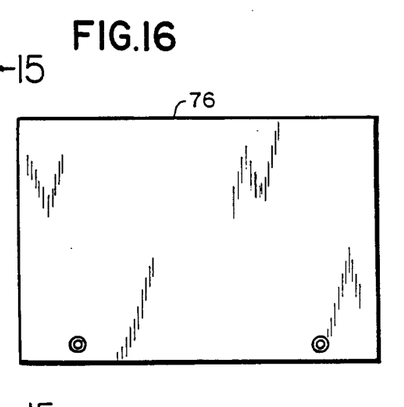
Figure 17:
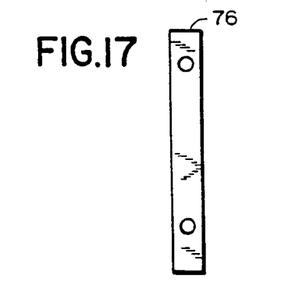

FIGS. 16 and 17 illustrate a short upright member 76, which is a simple rectangle, and which is to be fastened to one of the edges of the base member 64 to produce the feeding device 18. As illustrated in FIGS. 1-4, the short upright member 76 is attached to the ninety degree edge 66 of the base member 64 to provide a ninety degree angle to the upright member 76.

Figure 18:
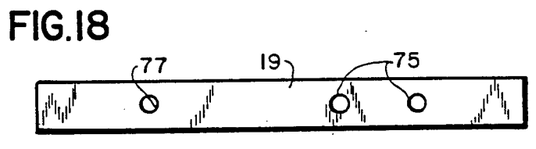

FIG. 18 is a top view of the guide rail 19 previously described in conjunction with FIG. 1, which rides in the guide slot 16 to guide the work feeding device 18. The guide rail is preferably dimensioned to exactly fit within the guide slot 16 of FIG. 1. The guide rail 19 preferably includes through holes 75 and a threaded hole 77 for attachment to the base plate 64 as described more fully below.

Figure 19:
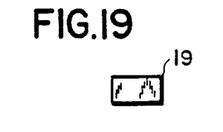

FIG. 19 is an end view of the guide rail 19.

Figure 20:
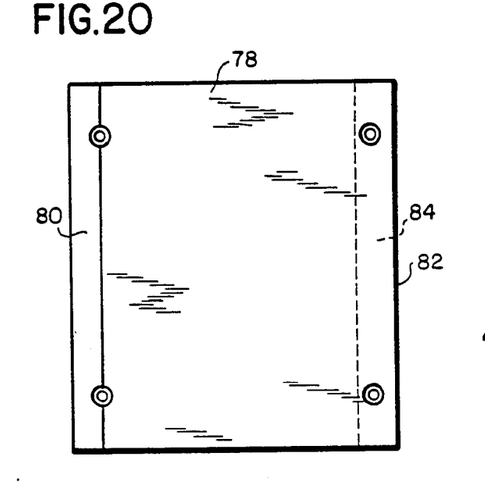

FIG. 20 is a top view of a larger upright member 78 which is alternatively mounted to the base plate 64 of FIG. 13 to provide for various angles of support for the work piece. One side edge 80 of member 78 is preferably slanted at an angle of about forty five degrees, and the other edge face 82 is cut away at one corner at 84 at an angle of twenty two and one half degrees to the horizontal.

Figure 21:
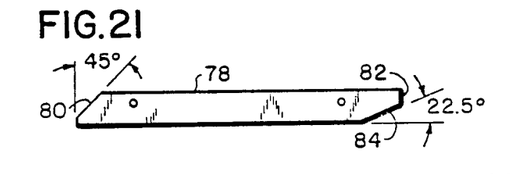

FIG. 21 is an end profile view of the member 78 which more clearly shows the forty five degree end face 80 and the twenty two and one half degree cut away corner surface 84.

For certain operations, an edge support must be provided, particularly for the member 78. That edge support is provided by a separate plate 86 illustrated in FIG. 22, which will be described more fully below in connection with later figures.

Figure 23:
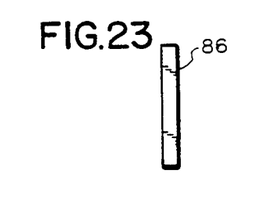

FIG. 23 is simply an end view of plate 86.

Figure 24:
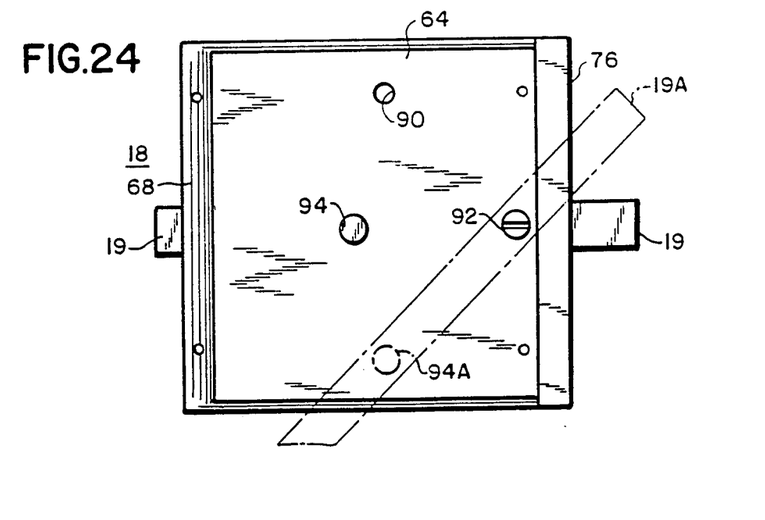

FIG. 24 is a top assembly view of the work feeding device 18 including the base plate 64, the short vertical plate 76 assembled to the ninety degree face 66 of the base plate 64, and the guide rail 19 attached to the bottom of the base plate 64. The showing of FIG. 24 generally corresponds to the showing of the work feeding device 18 in FIGS. 1-4, except for the additional details illustrated in FIG. 24. The base plate 64 includes various through holes indicated at 90 which are strategically positioned for attachment of the guide rail 19 to the base plate 64 in various positions. The guide rail 19 is basically attached to the base plate 64 by means of a shoulder screw 92 which extends through one of the through holes 90 in the base plate 64 and into the threaded hole 77 in the guide rail 19. The shoulder screw 92 serves as a pivot, and a pin 94 inserted through one of the through holes 90 into one of the guide rail holes 75 serves to determine the rotational position of the guide rail with respect to the base plate 64.

For the situation where the work feeding device vertical surface (of plate 76) should be rotated forty five degrees with respect to the direction of motion of the feeding device on the guide rail 19, the guide rail 19 may be rotated by forty five degrees about the pivot 92 to the position illustrated in phantom at 19A in FIG. 24. The pin 94 is then inserted through a different through hole 90, as indicated at 94A. In this manner, the orientation of the guide rail 19 and the base plate 64 can be quickly changed. Furthermore, it is apparent that the position of the guide rail may be changed to forty five degrees in the other direction by appropriate rotation of the guide rail 19 with respect to the base plate, and by the insertion of the pin 94 into one of the through holes 90 at the top of the base plate 64 as illustrated in FIG. 24.

Figure 22:
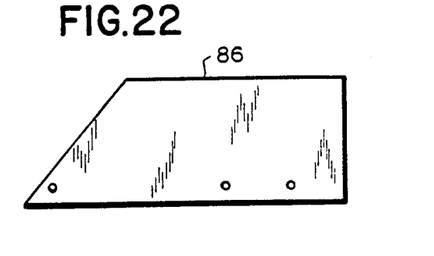
Figure 25:
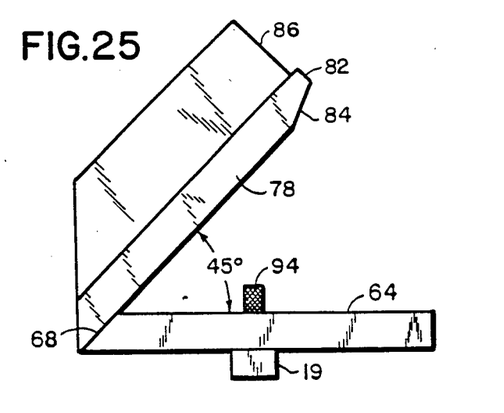

FIG. 25 illustrates how the long plate 78 may be typically assembled at the forty five degree face 68 of the base plate 64 to provide a forty five degree support for a work piece. Such a support is desired, for instance, in the production of a dovetail joint for two pieces which are joined at right angles to one another, as illustrated in FIG. 11. In order to provide a stop, or pushing guide for the work piece, the edge support member 86 of FIGS. 22 and 23 is preferably attached to one end of piece 78, as indicated in FIG. 25.

Figure 26:
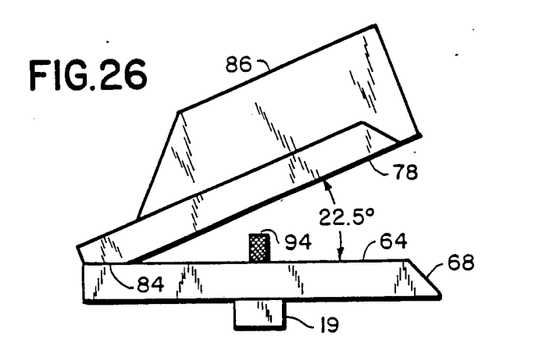

FIG. 26 is very similar to FIG. 25, except that it illustrates how the parts are assembled to provide a 22½ degree angle from the horizontal for the work piece. This is accomplished by placing the cut away corner surface 84 of the long upright piece 78 against the flat upper surface of the base plate 64 in assembling the parts in position.

Figure 27:
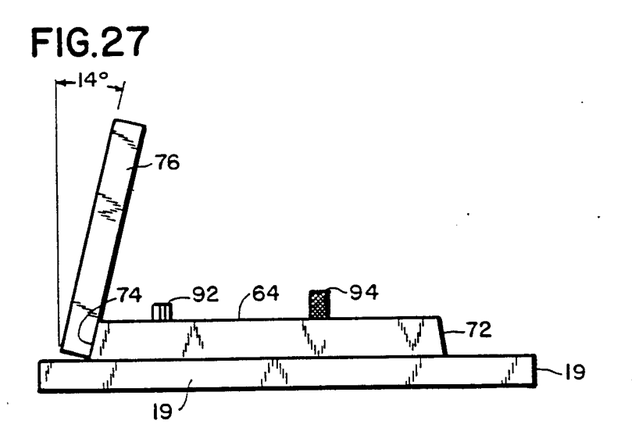

FIG. 27 illustrates how an angle of fourteen degrees from the vertical is obtained for the working upright portion of the work feeding device 18. This simply involves assembling the short upright member 76 of FIGS. 16 and 17 against the fourteen degree edge 74 of the base plate 64. In a similar manner, the nine degree position of the upright 76 may be obtained by assembling the upright plate 76 to the nine degree slanted edge 72 of the base plate 64. That arrangement is not illustrated. The various angles achievable in the above arrangements as described in conjunction with FIGS.

13–27 are the specific angles usually required in producing the joints contemplated in this invention.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. A woodworking tool combination for making interlocking joints in wood parts such as box finger joints and dovetail joints comprising a substantially rectangular body means for attachment to a tool table which includes at least one guide slot in the upper surface thereof for guiding a work feeding means, a work feeding means positioned and arranged for sliding engagement with said guide slot, a router tool, a vertically adjustable tool holder for holding and carrying said router tool with the router cutter axis parallel to said upper surface of said tool table attached to said body means, said body means being attached to a side edge of said tool table parallel to said guide slot, said tool holder being formed substantially in the shape of a sector of a circle and being attached to said body means by a pivotal attachment substantially at the center of the arc of said sector, said tool holder including a circular arc shaped gear rack at the circular arcuate edge thereof, a pinion gear rotatably attached to said body means and in engagement with said gear rack and including rotating means for vertical adjustment of said tool holder by rotation of said tool holder about said pivotal attachment by rotation of said pinion gear, and means for clamping said circular arcuate edge of said tool holder in a selected vertical position.

2. A woodworking tool combination as claimed in claim 1 wherein said body means includes an upper surface which is positioned and arranged to be substantially coplanar with the upper surface of the tool table when attached thereto.

3. A woodworking tool combination as claimed in claim 2 wherein said guide slot is included within said body means.

4. A woodworking tool combination as claimed in claim 2 wherein said tool holder is adjustable to a lowered position which carries the entire upper profile of said tool holder at least as low as said upper surface of said body means to permit unobstructed use of the combination of the tool holder and the tool table for other purposes.

5. A woodworking tool combination as claimed in claim 1 wherein said tool holder includes a scale on the outer face at the circular arcuate edge thereof for cooperation with an index mark at said pinion for providing a direct reading of the elevation of the center of the router tool carried by said tool holder above the upper surface of the tool table.

6. A woodworking tool combination as claimed in claim 5 wherein said scale is essentially proportional to the trigonometric sine of the angle of the center of the router tool above the upper surface of said tool table as determined by the rotation of said tool holder in order to provide a direct reading of the actual elevation of the center of the router tool above said upper surface of said tool table.

7. A woodworking tool combination as claimed in claim 1 wherein said body means includes said tool table.

8. A woodworking tool combination as claimed in claim 4 wherein said body means includes a notch in the edge thereof to provide clearance for the tip of a router tool bit as said tool holder is adjusted to said lowered position.

9. A woodworking tool combination as claimed in claim 1 wherein said work feeding means comprises a base plate, a guide slot rail beneath said base plate for sliding engagement with said guide slot, and an upright member firmly attached to the front edge of said base plate.

10. A woodworking tool combination as claimed in claim 9 wherein said guide slot rail is attached to said base plate by means of at least one pivotal fastening means having a substantially vertical axis which extends through an opening in said base plate into an opening in said guide slot rail and at least one pin member which extends through an opening in said base plate into a mating opening in said guide slot rail, said base plate including at least one additional opening for said pin member arranged in a 45 degree alignment away from the center line of said base plate and intersecting with said pivotal fastening means to provide for rotation of said base plate by 45 degrees with respect to said guide slot rail and refastening of said guide slot rail and said base plate in the rotated position to thereby provide for a 45 degree rotated position of said upright member when advancing work into the cutter of the tool.

11. A woodworking tool combination as claimed in claim 9 wherein said base plate of said work feeding means includes a plurality of side edges arranged at different angles with respect to the vertical, and said base plate including means for attachment of said upright member selectively at any selected one of said edges in order to provide different slant angles of said upright member to thereby provide different slant angles to the work piece as it is advanced into the cutter of the tool combination.

12. A woodworking tool combination as claimed in claim 9 wherein said upright member includes a shallow tilt angle tapered portion at the edge thereof, and wherein said upright member includes means for attachment to said base plate with said shallow tapered portion in engagement with the top surface of said base plate at the edge portion thereof to provide a corresponding shallow tilt to said upright plate for advancing work into said cutter tool.

13. A woodworking tool combination as claimed in claim 12 wherein said shallow edge portion is at an angle of $22\frac{1}{2}$ degrees from the horizontal.

* * * * *